April 20, 1965   P. J. FRANKLIN   3,179,553
LIGHTWEIGHT ARMOR PLATE
Filed March 12, 1963
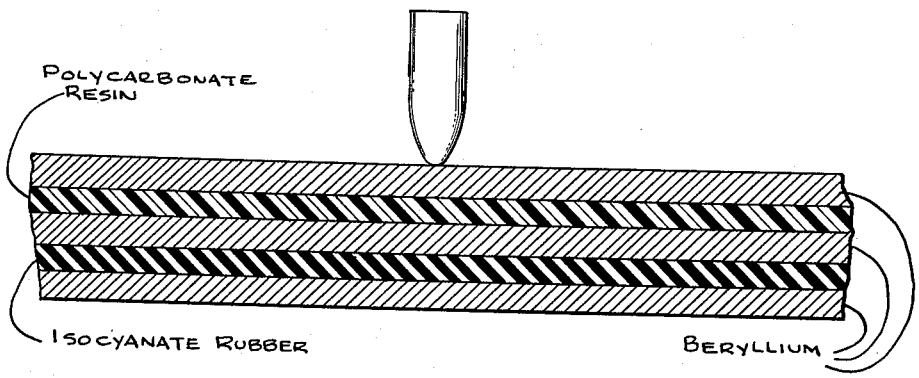
INVENTOR.
PHILIP J. FRANKLIN
BY
ATTORNEY

3,179,553
LIGHTWEIGHT ARMOR PLATE
Philip J. Franklin, 5907 Massachusetts Ave. NW.,
Washington, D.C.
Filed Mar. 12, 1963, Ser. No. 264,733
5 Claims. (Cl. 161—183)
(Granted under Title 35, U.S. Code (1952), sec. 266)

The invention described herein may be manufactured and used by or for the Government for governmental purposes without the payment to me of any royalty thereon.

This invention relates to lightweight armor plate to be used where the weight of conventional armor makes its use undesirable. One particular example where the weight of armor plate is critical is in military aircraft. Aircraft, such as helicopters, lose a great amount of their carrying capacity if they are loaded down with heavy armor, but still in certain circumstances armor is needed. This armor should prevent the penetration of any small arms fire which an aircraft is likely to encounter upon landing and taking off.

The principal object of this invention is to provide a lightweight armor capable of deterring small arms fire.

Another object of this invention is to provide a lightweight armor plate which combines the qualities of high impact resistance and also high resistance to shattering.

Still another object of this invention is to provide a lightweight armor plate which includes an energy spreading and an energy absorbing element.

The figure is a sectional view of the lightweight armor plate showing the elements which make up this armor plate.

The lightweight armor plate of this invention is essentially a composite or build up of several laminated layers. The figure shows the different layers in this armor plate. The top layer which is subject to contact with a bullet or other projectile is a layer of beryllium. Next is a layer of a polycarbonate resin such as "Lexan" which is cemented or by other means caused to adhere to the bottom side of said top layer of beryllium. To the bottom side of this polycarbonate resin there is cemented a second or middle layer of beryllium. A layer of an isocyanate rubber such as "Vulcollane" is next cemented with an adhesive to the bottom surface of the middle layer of beryllium. The final layer which forms the inside surface of this armor plate is a third layer of beryllium which is cemented to the bottom of the isocyanate rubber layer. In between the first and second layer of beryllium is a polycarbonate resin layer which can be any suitable polycarbonate resin, and "Lexan" which is manufactured by General Electric Co. is given as an example. Between the second and third layers of beryllium is an isocyanate rubber layer of which "Vulcollane" is given as an example.

Beryllium is a very hard metal and has an extremely high resistance to impact deformation which is much greater than steel. The main disadvantage in using beryllium alone as armor plate is that it sometimes shatters under impact. This disadvantage is minimized if not eliminated by the use of the two layers, one a polycarbonate resin and the other isocyanate rubber. A polycarbonate resin such as "Lexan" possesses an unusual combination of toughness, impact strength, and dimensional stability. When a layer of "Lexan" is bonded between two layers of beryllium it has the property of spreading the impact over a larger area. Thus when a projectile strikes the outside layer of beryllium the impact energy which is concentrated at the point of impact is spread over a larger area by the "Lexan" and the energy then passed onto the second beryllium layer. Between the second and third layer of beryllium is an isocyanate rubber such as "Vulcollane" which will act as an absorbing medium for the energy passing through the armor plate. The isocyanate rubber after absorbing a portion of this impact energy will pass on a smaller amount of energy to the third or inside beryllium layer.

The polycarbonate resin layer and the isocyanate rubber layer in addition to their energy spreading and absorbing characteristics will also prevent the shattering of the beryllium because these two layers which are bonded to the beryllium with adhesive will make the armor similar to shatterproof window glass. There is enough resiliency in the resin and rubber layers to hold the beryllium together upon impact.

The adhesive used to bond the resin and rubber layers to the beryllium layers can be any adhesive that will adhere to a polycarbonate resin and beryllium metal, or to an isocyanate rubber and beryllium. An adhesive that could be used for bonding all layers together in the armor plate is an epoxy resin.

To provide additional strength in the armor plate, a reinforcing layer can be embedded in the polycarbonate resin layer and also the rubber layer. A suitable reinforcing layer is fiberglass and can be embedded in both organic layers up to the extent of 96% by weight of the organic layers. The reinforcing fiberglass can either be included in the organic layers as a woven fabric or as loose fibers.

I claim:
1. A lightweight armor plate comprising:
   (a) a first layer of beryllium;
   (b) a second layer of a polycarbonate resin bonded to said first layer of beryllium;
   (c) a third layer of beryllium bonded to said second layer;
   (d) a fourth layer of isocyanate rubber bonded to said third layer; and
   (e) a fifth layer of beryllium bonded to said fourth layer of isocyanate rubber.
2. A lightweight armor plate comprising a plurality of layers of beryllium held in space relationship by alternating layers of polycarbonate resin and isocyanate rubber bonded to said beryllium layers.
3. A lightweight armor plate as claimed in claim 1 wherein the polycarbonate resin layer and the isocyanate rubber layer each have a fiberglass reinforcing material embedded in said layers.
4. A lightweight armor plate as claimed in claim 3 wherein said fiberglass reinforcing material occupies up to 96% by weight of said polycarbonate resin and said isocyanate rubber layers.
5. A lightweight armor plate as claimed in claim 1 wherein said layers are bonded together by an epoxy resin.

References Cited by the Examiner

UNITED STATES PATENTS

| | | | |
|---|---|---|---|
| 2,706,166 | 4/55 | Gurney | 117—75 |
| 2,723,214 | 11/55 | Meyer | 161—404 |
| 2,733,177 | 1/56 | Meyer | 161—404 |

OTHER REFERENCES

Lexan, Polycarbonate Resins, Technical Report CDC-502, published by General Electric, January 18, 1962, p. 7 relied on.

EARL M. BERGERT, *Primary Examiner.*
JACOB STEINBERG, *Examiner.*